(12) United States Patent
Mittal et al.

(10) Patent No.: US 11,721,816 B2
(45) Date of Patent: Aug. 8, 2023

(54) INTEGRATED FLOW BATTERY STACK AND HEAT EXCHANGER

(71) Applicant: DELECTRIK SYSTEMS PRIVATE LIMITED, Haryana (IN)

(72) Inventors: Vishal Onkarmal Mittal, Haryana (IN); Sunil Bhat, Haryana (IN); Mainpal Singh, Haryana (IN)

(73) Assignee: DELECTRIK SYSTEMS PRIVATE LIMITED, Gurgaon (IN)

( * ) Notice: Subject to any disclaimer, the term of this patent is extended or adjusted under 35 U.S.C. 154(b) by 106 days.

(21) Appl. No.: 17/429,320

(22) PCT Filed: Dec. 6, 2019

(86) PCT No.: PCT/IB2019/060515
§ 371 (c)(1),
(2) Date: Aug. 6, 2021

(87) PCT Pub. No.: WO2020/170023
PCT Pub. Date: Aug. 27, 2020

(65) Prior Publication Data
US 2022/0109167 A1     Apr. 7, 2022

(30) Foreign Application Priority Data
Feb. 22, 2019 (IN) .............................. 201911007067

(51) Int. Cl.
*H01M 8/04*          (2016.01)
*H01M 8/04007*       (2016.01)
(Continued)

(52) U.S. Cl.
CPC ... *H01M 8/04074* (2013.01); *H01M 8/04029* (2013.01); *H01M 8/0432* (2013.01);
(Continued)

(58) Field of Classification Search
CPC ......... H01M 8/04029; H01M 8/04074; H01M 8/0432; H01M 8/0459; H01M 8/04701; H01M 8/04723
See application file for complete search history.

(56) References Cited

U.S. PATENT DOCUMENTS 11,495,808 B2 * 11/2022 Finnerty ............. H01M 8/2457
2009/0053571 A1   2/2009 Takata et al.
(Continued)

FOREIGN PATENT DOCUMENTS

CN       106410315 A  *  2/2017  .......... H01M 10/613
WO   WO-2013023415 A  *  2/2013  .......... H01M 8/0432

OTHER PUBLICATIONS

International Search Report and Written Opinion issued in corresponding Application No. PCT/IB2019/060515 dated Feb. 28, 2020.

*Primary Examiner* — Amanda C. Walke
(74) *Attorney, Agent, or Firm* — Thomas W. Cole; Calderon Safran & Cole P.C.

(57) ABSTRACT

The present disclosure provides an integrated flow battery stack with a heat exchanger for thermal control of the battery during operation. The battery can comprise a stack consisting a plurality of electrochemical cells, each cell comprising a pair of electrodes separated by a membrane and sandwiched between a pair of bipolar plates. Each bipolar plate is shared between two adjacent cells. The stack is connected to an external electrical circuit by two current collectors placed at each end of the stack. At least one current collector plate is thermally coupled to a heat exchange plate which can be configured to have its temperature varied through external means. The heat exchange plate exchanges heat with the battery stack and maintains the temperature of the stack, by implication, maintains the temperature of the circulating electrolytes.

8 Claims, 4 Drawing Sheets

(51) Int. Cl.

| | | |
|---|---|---|
| *H01M 8/04029* | (2016.01) | |
| *H01M 8/0432* | (2016.01) | |
| *H01M 8/04746* | (2016.01) | |
| *H01M 8/18* | (2006.01) | |
| *H01M 4/86* | (2006.01) | |

(52) U.S. Cl.
CPC ... *H01M 8/04059* (2013.01); *H01M 8/04768* (2013.01); *H01M 8/188* (2013.01); *H01M 2004/8694* (2013.01)

(56) References Cited

U.S. PATENT DOCUMENTS

| | | | |
|---|---|---|---|
| 2010/0040924 A1* | 2/2010 | Niroumand | H01M 8/0258 |
| | | | 429/479 |
| 2011/0104581 A1* | 5/2011 | Bae | H01M 8/04067 |
| | | | 429/434 |
| 2013/0029196 A1* | 1/2013 | Perry | H01M 8/2484 |
| | | | 429/70 |
| 2013/0071714 A1 | 3/2013 | Perry et al. | |
| 2014/0318753 A1* | 10/2014 | Greiner | F28D 1/05366 |
| | | | 165/166 |
| 2015/0266144 A1* | 9/2015 | Bengaouer | F28D 20/021 |
| | | | 165/10 |
| 2017/0200965 A1 | 7/2017 | Yano | |
| 2019/0214691 A1* | 7/2019 | Saroka | H01M 10/6554 |

\* cited by examiner

INTEGRATED FLOW BATTERY STACK AND HEAT EXCHANGER

TECHNICAL FIELD

The present disclosure relates generally to the field of flow battery thermal control. In particular, the present disclosure relates to the control of a flow battery electrolyte within an optimal operating temperature range.

BACKGROUND

Background description includes information that may be useful in understanding the present invention. It is not an admission that any of the information provided herein is prior art or relevant to the presently claimed invention, or that any publication specifically or implicitly referenced is prior art.

Flow Battery (FB), also known as Redox Flow Battery is an energy storage system which stores energy in the form of chemical energy and converts it into electrical energy by a reduction-oxidation (redox) reaction. In a FB, the energy storage capacity is determined based on the amount and concentration of electrolyte present in the system which is stored in external tanks. Here, no electro-deposition or loss in electroactive substances takes place when the battery is repeatedly cycled, thereby significantly increasing its lifetime, compared to conventional solid-state batteries.

The FB system comprises of three key elements: the electrolyte, which determines the amount of energy in the system is typically stored in two separate tanks, consisting of a positive electrolyte or catholyte and negative electrolyte or the anolyte; the stack, which determines the power of the system and consists of one or more cells typically connected electrically in series and fluidically in parallel; and the Balance of Plant (BOP), which includes other components such as pumps which feed the electrolyte from the tanks to the stack, plumbing through which the electrolyte flows and a battery management system consisting of sensors, control circuit for the overall system.

Of particular interest are the all-vanadium redox flow batteries (VRFBs). In this type of flow battery, the positive electrolyte contains $VO_2^+$ ions which undergo a reduction reaction to $VO^{2+}$ plus electricity during its discharge cycle. The opposite oxidation reaction takes place during the charging of the battery, where $VO^{2+}$ ion plus electricity are oxidised back to $VO_2^+$ ions. In the negative electrolyte $V^{2+}$ ions undergo an oxidation reaction to yield $V^{3+}$ ions plus electricity during its discharge cycle. During the charging cycle $V^{3+}$ ions plus electricity in the negative electrolyte is reduced back to $V^{2+}$ ions. However, in order to have a fluid electrolyte with vanadium ions, vanadium salts are generally dissolved in highly acidic solutions containing hydrochloric acid or sulphuric acid.

Typically, in FBs the energy is contained in the electrolyte stored in the tanks and power is generated by the electrochemical reaction in the cell or the stack. During operation, the electrolyte from the tanks is circulated into the stack using pumps. However, inherent inefficiencies in the electrochemical reactions occurring in the cell are converted into heat, and this heat is carried away by the circulating electrolytes.

The flow battery functions optimally within a range of temperature, and continued heat generation can increase the temperature of the electrolytes above the range of temperature causing degradation of the stack and electrolyte. To overcome this problem, use of heat exchangers have been proposed either upstream or downstream of the stack. The use of acidic electrolytes complicates the use of heat exchangers primarily because of the need for acid resistant materials such as graphite to be used in heat exchanger, which can make the equipment expensive. Another proposed idea is to use coolant loops inside or outside the reservoirs containing the electrolyte, but the electrolyte reservoirs are generally made of plastic and heat extraction by conductive or convective means is limited.

Additionally, when the flow battery is operated in regions with sub-zero ambient temperature the electrolyte which is aqueous in nature can freeze, which is also detrimental to the performance of the battery.

There is therefore a requirement in the art for a thermal management system for a flow battery that can work to heat or cool the electrolyte to maintain the temperature within an optimal working temperature range without using complex and expensive auxiliary equipment.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

In some embodiments, the numbers expressing quantities or dimensions of items, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all groups used in the appended claims.

Objects

A general object of the present disclosure is to provide an integrated flow battery stack and a heat exchanger system for thermal management of the battery.

Another object of the present disclosure is to provide a flow battery system that can heat or cool the electrolyte Another object of the present disclosure is to provide a flow battery system that can maintain the electrolyte operating temperature within an acceptable temperature range.

Another object of the present disclosure is to provide a flow battery system that prevents component degradation and is inexpensive.

SUMMARY

The present disclosure relates generally to the field of flow battery thermal control. In particular, the present disclosure relates to the control of a flow battery electrolyte within an optimal operating temperature range.

The present disclosure provides an integrated flow battery stack and heat exchange module comprising: a battery stack comprising a plurality cells coupled electrically and thermally to one another, each of the plurality of cells comprising two electrodes separated by a membrane, wherein a negative electrolyte and a positive electrolyte are circulated through each of the plurality of cells to enable redox reaction at each of the two electrodes; a current collector plate at each end of the battery stack, each current collector plate electrically and thermally coupled to said battery stack, and each current collector plate electrically coupled to an external circuit element; a heat exchange plate thermally coupled to at least one current collector plate, said heat exchange plate further coupled to a temperature regulator, wherein said temperature regulator is configured to control the temperature of the heat exchange plate, and wherein said heat exchange plate exchanges heat with the battery stack to enable temperature of the battery stack to be within a predetermined optimal range of temperature.

In an embodiment, the plurality of cells are thermally coupled to one another through bipolar plates.

In another embodiment, a thermally conducting and electrically non-conducting layer is disposed between the current collector plate and the at least one heat exchange plate to electrically isolate the heat exchange plate from the stack.

In another embodiment, the temperature regulator comprises one or more processors operatively coupled to one or more temperature sensors, said temperature regulator configured to measure temperature of the battery stack, and wherein, based on the measured temperature, the temperature regulator controls the temperature of the heat exchange plate to effect heat exchange with the stack.

In another embodiment, the heat exchange plate is configured with a plurality of fins adapted to conduct heat to an ambient. In another embodiment, a fan is operatively coupled to the temperature regulator and is configured to provide forced circulation of ambient air over the heat exchange plate.

In another embodiment, the heat exchange plate is configured with a plurality of channels configured on is surface, the plurality of channels adapted to allow flow of a thermal fluid. In another embodiment, the heat exchanger is operatively coupled to the temperature regulator and is adapted to control the temperature of the thermal fluid.

Various objects, features, aspects and advantages of the inventive subject matter will become more apparent from the following detailed description of preferred embodiments, along with the accompanying drawing figures in which like numerals represent like components.

BRIEF DESCRIPTION OF DRAWINGS

The accompanying drawings are included to provide a further understanding of the present invention and are incorporated in and constitute a part of this specification. The drawings illustrate exemplary embodiments of the present invention and, together with the description, serve to explain the principles of the present invention.

DETAILED DESCRIPTION

Figure 1:
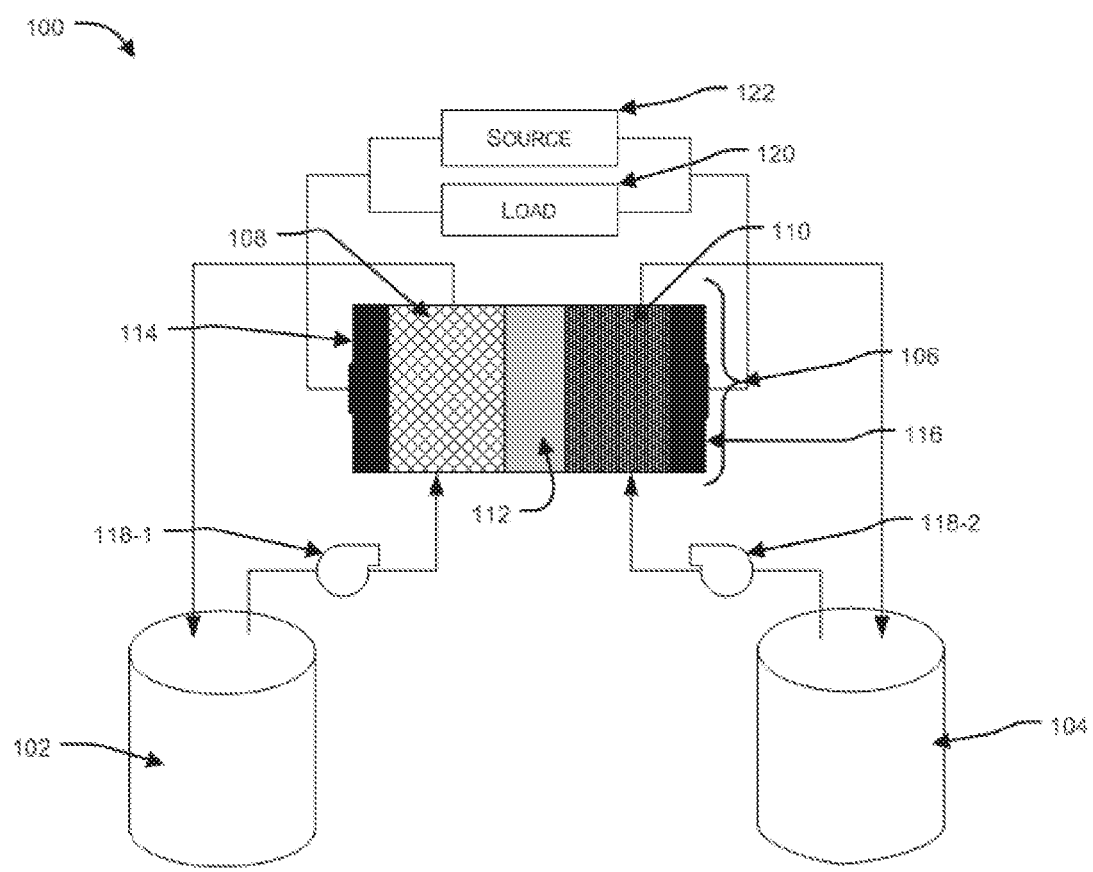
FIG. 1 illustrates a typical representation of a flow battery unit, as known in the art

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Exemplary embodiments will now be described more fully hereinafter with reference to the accompanying drawings, in which exemplary embodiments are shown. These exemplary embodiments are provided only for illustrative purposes and so that this disclosure will be thorough and complete and will fully convey the scope of the invention to those of ordinary skill in the art. The invention disclosed may, however, be embodied in many different forms and should not be construed as limited to the embodiments set forth herein. Various modifications will be readily apparent to persons skilled in the art. The general principles defined herein may be applied to other embodiments and applications without departing from the spirit and scope of the invention. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure). Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

The use of any and all examples, or exemplary language (e.g., "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

The present disclosure provides a stack configured to maintain an optimal temperature of the electrolytes without resorting to complex and expensive heat exchangers to directly heat or cool the electrolyte. This enables thermal management of the electrolyte without the requirement for special materials to handle the acidic electrolytes, thereby bringing a significant economic advantage to the invention. Further, the proposed stack architecture does not interfere with the primary function of the stack to charge and discharge the electrolyte.

FIG. 1 illustrates a typical representation of a flow battery unit, as known in the art. In an aspect, the flow battery unit 100 (hereinafter, also referred to as "battery") broadly comprises: a tank 102 containing a negative electrolyte; a tank 104 containing a positive electrolyte; and an electrochemical cell 106 (hereinafter, also referred to as "cell"). In an embodiment, the tanks 102, 104 are fluidically coupled to the cell 106.

In another aspect, the cell 106 comprises a negative electrode 108 and a positive electrode 110. In an embodiment, the negative electrode 108 and the positive electrode 110 can be porous and each can be adapted to allow the negative electrolyte and positive electrolyte to flow through it respectively. In another embodiment, the negative electrode 108 and positive electrode 110 can be separated by a membrane 112. In another embodiment, the membrane 112 can be an ion exchange membrane or a microporous separator.

In another embodiment, the electrodes 108, 110 and membrane 112 assembly can be sandwiched between a negative bipolar plate 114 and a positive bipolar plate 116. The bipolar plates are electrically conductive plates and are so termed because, when a plurality of cells are connected in a stack, in series, two adjacent cells share a common bipolar plate—the bipolar plate is connected to the cathode of one cell and the anode of the adjacent cell. In another embodiment, the bipolar plates can be made of a conducting material such as graphite.

In an aspect, the electrolyte can be pumped from the tanks 102, 104 into the cell 106 by two or more pumps. Typically, a separate pump 118-1, 118-2 are used to pump negative electrolyte and positive electrolyte respectively.

In another aspect, during operation, the electrolytes are continuously circulated through the cell 106. Ion exchange occurs between the negative electrolyte and the positive electrolyte through the membrane 112, and electron transfer occurs from the electrodes 108, 110 to the bipolar plates 114, 116.

In another aspect, the bipolar plates 114, 116, in turn, are connected to an external load 120 (during battery discharge) or an external source 122 (during battery charge) through a current collector each which can be made of a metallic conductor such as Copper.

Figure 2:
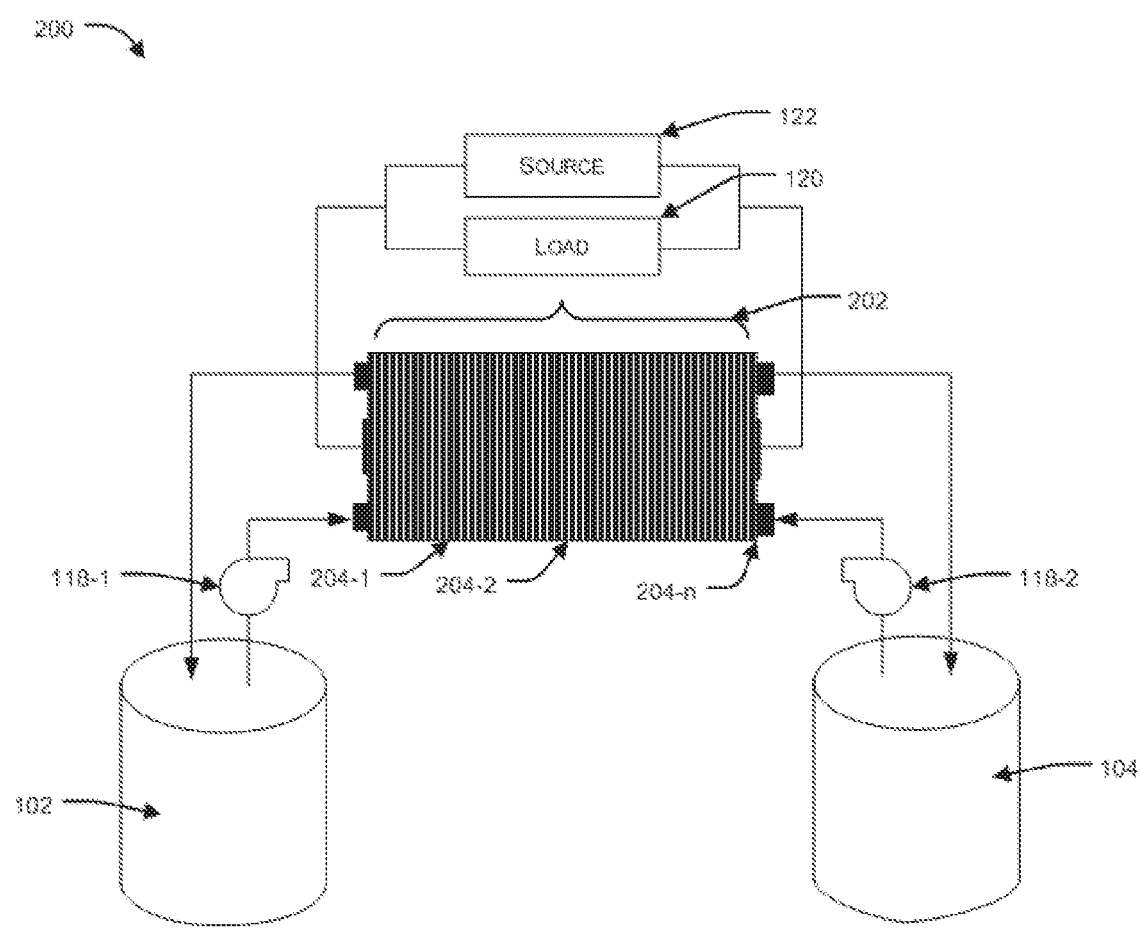
FIG. 2 illustrates a typical representation of a flow battery unit with a single stack, as known in the art.

FIG. 2 illustrates a typical representation of a flow battery unit with a single stack, as known in the art. In an aspect, the stack 202 in the battery unit 200 (hereinafter, also referred to as "battery") refers to one or more electrochemical cells 204-1, 204-2 . . . 204-n (hereinafter, also referred to as "cells" and collectively designated 204).

In an aspect, the pumps 118-1, 118-2 feed the negative electrolyte and the positive electrolyte to the negative side of the stack and the positive side of the stack respectively. The operation of the battery 200 is as described previously for battery 100 in FIG. 1.

In another aspect, voltage efficiency of a flow battery unit is given by $\eta V = V_d/V_c$, where $V_d$ is the average discharge voltage and $V_c$ is the average charge voltage. Here, efficiency loss can be due to the irreversibility of the ohmic losses in the battery, primarily in the membrane and the electrode and adjacent interfacial resistances.

In another aspect, Faradaic efficiency or current efficiency of the flow battery unit is given by $\eta = Q_d/Q_c$, where $Q_d$ is the total charge delivered to the load by the battery during discharge and $Q_c$ is the total charge received by the battery during charging.

In another aspect, overall efficiency of the above described flow battery unit is given by $\eta E = \eta V \times \eta F$.

The energy efficiency loss is converted into heat in the stack and transferred to the circulating electrolyte. The electrolytes function best within an optimal temperature range, and when the electrolyte heats up beyond that temperature leads to degradation of electrolyte and stack. This can be especially applicable in climates with a high ambient temperature.

In corollary, in climates where the temperatures are very low, such as sub-zero temperature, there arises a challenge of working a flow battery. Since many of the electrolytes are water based, there is a danger of a part or all of the electrolyte freezing, which is detrimental to the performance of the flow battery.

An ideal way to overcome the problem is to provide a mechanism that allows the electrolyte to come in contact with a heat exchanger to maintain the temperature of the electrolyte within the optimal range. The mechanism can be a heat exchanger located upstream or downstream the electrolyte circuit or a heat loop introduced into the electrolyte reservoir. However, the electrolytes used in many flow batteries is typically very acidic, and this offers a severe limitation to the components that can be used in the battery. The components have to be both thermally conductive and acid resistant, and such materials such as graphite increase the cost and complexity of the flow battery.

Embodiments described herein provide a flow battery stack configured to maintain an optimal temperature of the electrolyte by using one or both ends of the stack as a heat sink or source.

Figure 3:
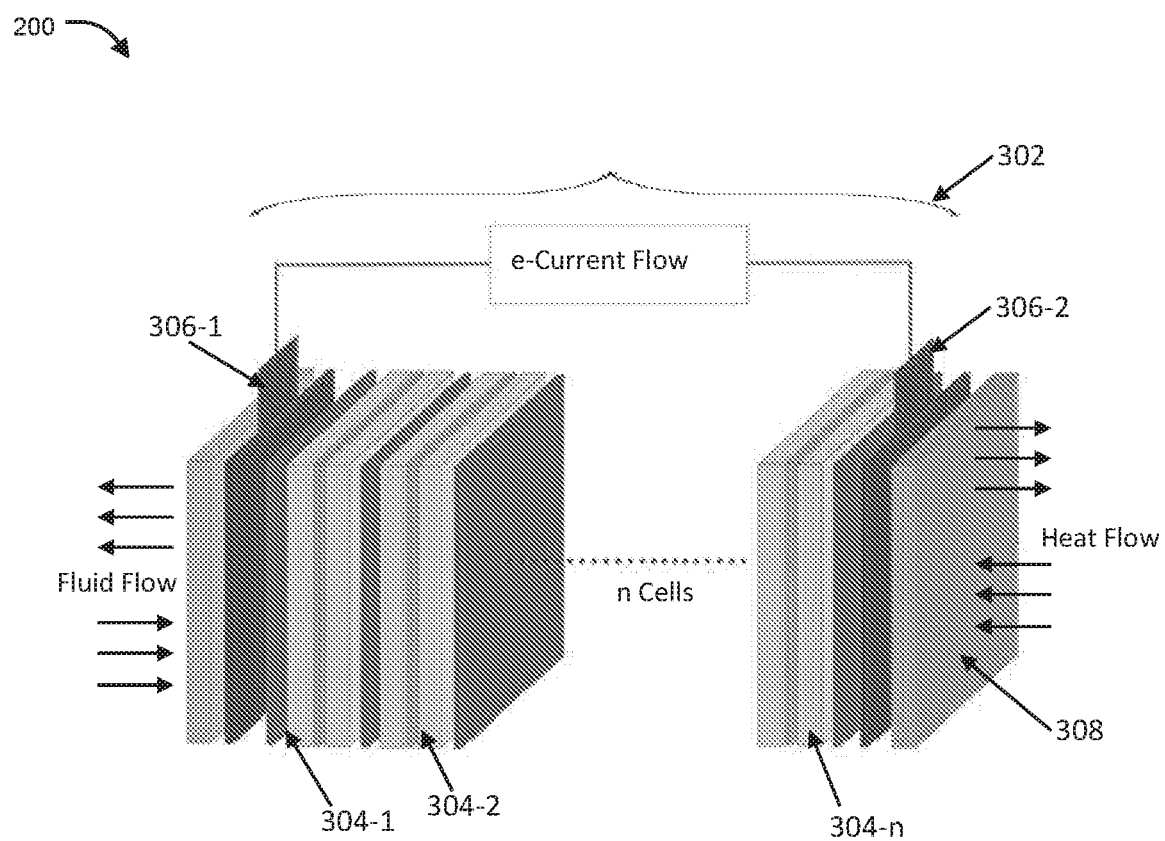
FIG. 3 illustrates an exemplary representation of a flow battery stack architecture configured for maintaining temperature of the electrolyte within an optimal range, in accordance with embodiments of the present disclosure.

FIG. 3 illustrates an exemplary representation of a flow battery stack architecture configured for maintaining temperature of the electrolyte within an optimal range, in accordance with embodiments of the present disclosure.

In an embodiment, the stack 302 in the battery unit 300 (hereinafter, also referred to as "battery") comprises a plurality of electrochemical cells 304-1, 304-2 . . . 304-$n$ (hereinafter, also referred to as "cells" and collectively designated 304). Each of the plurality of cells 304 comprise a pair of electrodes separated by a membrane and sandwiched between a pair of bipolar plates, as earlier described. In an exemplary embodiment, the cells 304 are connected in series with two adjacent cells sharing a common bipolar plate.

In another embodiment, the electrolytes can be pumped into each cell by individual pumps, or, typically through a manifold. The manifold is generally disposed at one end of the stack and is configured to circulate positive and negative electrolytes to each of the cells 304.

In an embodiment, the electrodes and bipolar plates are generally made of an electrically conducting material such as graphite, graphite also being thermally conducting. This allows the temperature of the reaction absorbed by the electrolyte to be conducted across the entire stack 302.

In another embodiment, at the two ends of the stack, i.e., one electrode end of the cell 304-1 and the end of the electrode of opposite polarity of cell 304-$n$, a current collector each (306-1, 306-2) is disposed, which collect the cumulative current generated by the stack 302. Typically, end plates are provided at the two ends of the stack 302, which provide structural support to the stack the end plates are made of a material that is thermally conducting.

In an embodiment, since the end plates are thermally conducting, the heat of the stack is also conducted to the end plates, they can be modified and re-configured to also supply or remove heat from the stack 302.

In another embodiment, the present disclosure provides a stack 302 with a heat exchange plate at least on one end of the stack which can be configured to act as a heat source or a heat sink to the stack 302.

Typically, at one end of the stack 302, the manifolds for the negative and positive electrolytes can be disposed. In an embodiment, at the other end of the stack 302 can be disposed the heat exchange plate 308. The heat exchange plate 308 can be made of a thermally conductive material and thermally coupled to the stack 302 through the current collector 306-2. The heat exchange plate 308 is configured to be heated or cooled using a suitable heating or cooling mechanism. The heat exchange plate 308, thermally coupled to the stack 302, can appropriately maintain the stack temperature due to heat exchange between the stack 302 and the heat exchange plate 308, and, by implication, maintain the temperature of the electrolytes within an optimal temperature range.

In another embodiment, the heat exchange plate 308 can be operatively coupled to a temperature sensor which, on sensing a deviation in the temperature of the electrolyte from the working temperature range, can engage the heating or cooling mechanism to appropriately change the temperature of the heat exchange plate 308.

Figure 4:
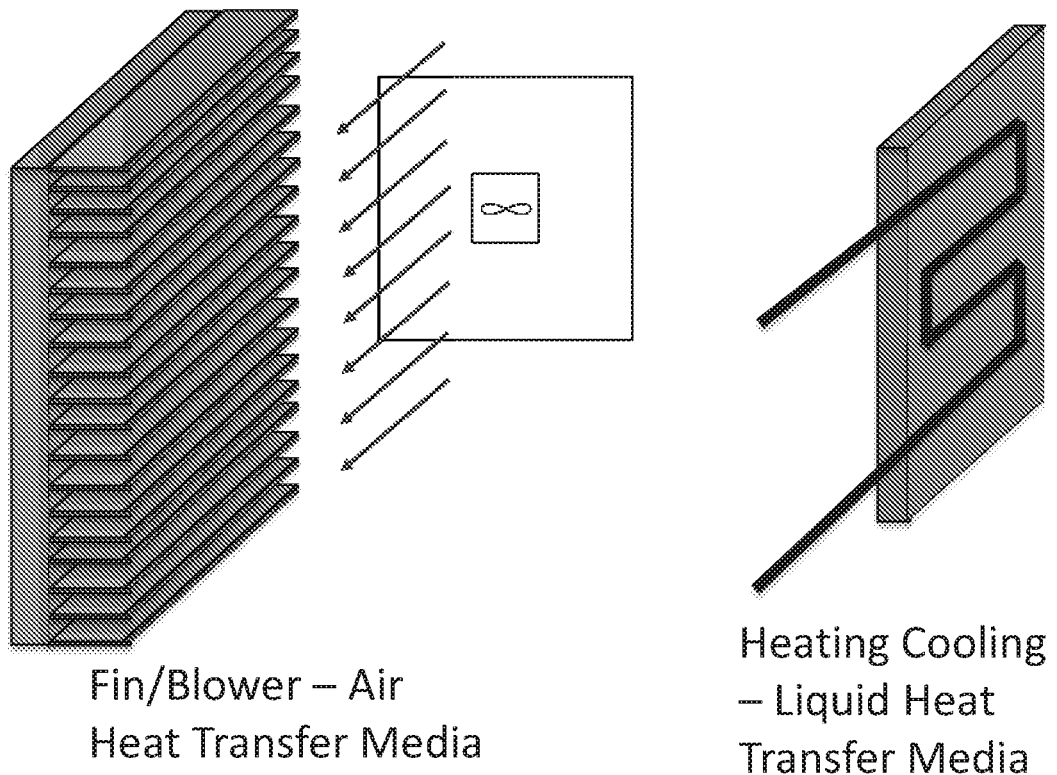
FIG. 4 illustrates exemplary heat exchange plates that can be integrated with the stack, in accordance with embodiments of the present disclosure.

FIG. 4 illustrates exemplary heat exchange plates that can be integrated with the stack, in accordance with embodiments of the present disclosure.

In an embodiment, the heat exchanger plate 308 can be configured with a plurality of fins with a suitable air circulation mechanism. The fins can conduct the transferred heat of the stack 302 which can then be carried away by the circulating air. However, the fins work best when transferring heat away from the stack 302 to cool the stack 302.

In another embodiment, the heat exchange plate 308 can be configured with channels for the flow of a working fluid, said working fluid being a thermal fluid configured to be heated or cooled at an externally disposed heat exchanger. The heat exchanger can heat or cool the fluid to a temperature as required such that, as the fluid circulates through the heat exchange plate 308, the heat exchange plate 308 is heated or cooled respectively.

In another embodiment, a second heat exchange plate can be thermally coupled to the stack 302, on the side of the current collector 306-1. Accordingly, the stack can be modified to receive the manifold for the electrolytes.

In another embodiment, the addition of the heat exchange plate to the battery stack can maintain the temperature of the battery stack—while cooling to an optimal range of temperatures or while heating to an optimal range of temperatures. In an exemplary instance, the heat exchange plate can maintain the temperature of the battery stack, while cooling to under about 60° C., and while heating, to above 0° C.

In another embodiment, a thermally conducting, but electrically non-conducting layer can be disposed between the heat exchange plate 308 and the current collector 306-2 to electrically isolate the heat exchange plate from the stack.

It should be apparent to those skilled in the art that many more modifications besides those already described are possible without departing from the inventive concepts herein. The inventive patient matter, therefore, is not to be restricted except in the spirit of the appended claims. Moreover, in interpreting both the specification and the claims, all terms should be interpreted in the broadest possible manner consistent with the context. In particular, the terms "includes" and "including" should be interpreted as referring to elements, components, or steps in a non-exclusive manner, indicating that the referenced elements, components, or steps may be present, or utilized, or combined with other elements, components, or steps that are not expressly referenced. Where the specification claims refer to at least one of something selected from the group consisting of A, B, C . . . and N, the text should be interpreted as requiring only one element from the group, not A plus N, or B plus N, etc. The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practised with modification within the spirit and scope of the appended claims.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

ADVANTAGES

The present disclosure provides an integrated flow battery stack and a heat exchanger system for thermal management of the battery.

The present disclosure provides a flow battery system that can heat or cool the electrolyte The present disclosure provides a flow battery system that can maintain the electrolyte operating temperature within an acceptable temperature range.

The present disclosure provides a flow battery system that prevents component degradation and is inexpensive.

We claim:

1. An integrated flow battery stack and heat exchange module comprising:
   a battery stack comprising a plurality of cells coupled electrically and thermally to one another, each of the plurality of cells comprising two electrodes separated by a membrane, wherein a negative electrolyte and a positive electrolyte are circulated through each of the plurality of cells to enable redox reaction at each of the two electrodes;
   a current collector plate at each end of the battery stack, each current collector plate electrically and thermally coupled to said battery stack, and each current collector plate electrically coupled to an external circuit element, wherein the current collector plate is configured to collect cumulative current generated by the battery stack and to supply or remove heat from the battery stack;
   a heat exchange plate thermally coupled to at least one current collector plate, said heat exchange plate further coupled to a temperature regulator, wherein said temperature regulator is configured to control the temperature of the heat exchange plate, and
   wherein said heat exchange plate exchanges heat with the battery stack through the current collector plate to enable temperature of the battery stack to be within a predetermined optimal range of temperature.

2. The integrated flow battery stack and heat exchange module as claimed in claim 1, wherein the plurality of cells are thermally coupled to one another through bipolar plates.

3. The integrated flow battery stack and heat exchange module as claimed in claim 1, wherein a thermally conducting and electrically non-conducting layer is disposed between the current collector plate and the at least one heat exchange plate to electrically isolate the heat exchange plate from the stack.

4. The integrated flow battery stack and heat exchange module as claimed in claim 1, wherein the temperature regulator comprises one or more processors operatively coupled to one or more temperature sensors, said temperature regulator configured to measure temperature of the battery stack, and wherein, based on the measured temperature, the temperature regulator controls the temperature of the heat exchange plate to effect heat exchange with the stack.

5. The integrated flow battery stack and heat exchange module as claimed in claim 1, wherein the heat exchange plate is configured with a plurality of fins adapted to conduct heat to an ambient.

6. The integrated flow battery stack and heat exchange module as claimed in claim 5, wherein a fan is operatively coupled to the temperature regulator and is configured to provide forced circulation of ambient air over the heat exchange plate.

7. The integrated flow battery stack and heat exchange module as claimed in claim 1, wherein the heat exchange plate is configured with a plurality of channels configured on is surface, the plurality of channels adapted to allow flow of a thermal fluid.

8. The integrated flow battery stack and heat exchange module as claimed in claim 7, wherein the heat exchanger is operatively coupled to the temperature regulator and is adapted to control the temperature of the thermal fluid.

* * * * *